United States Patent
Iwaguchi et al.

(10) Patent No.: US 11,927,798 B2
(45) Date of Patent: Mar. 12, 2024

(54) OPTICAL FIBER

(71) Applicant: SUMITOMO ELECTRIC INDUSTRIES, LTD., Osaka (JP)

(72) Inventors: Noriaki Iwaguchi, Osaka (JP); Haruki Okuyama, Osaka (JP); Takahisa Yamaguchi, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 547 days.

(21) Appl. No.: 17/054,589

(22) PCT Filed: May 16, 2019

(86) PCT No.: PCT/JP2019/019577
§ 371 (c)(1),
(2) Date: Nov. 11, 2020

(87) PCT Pub. No.: WO2019/221248
PCT Pub. Date: Nov. 21, 2019

(65) Prior Publication Data
US 2021/0181411 A1 Jun. 17, 2021

(30) Foreign Application Priority Data
May 16, 2018 (JP) ................................ 2018-094592

(51) Int. Cl.
*G02B 6/02* (2006.01)
*C03C 25/105* (2018.01)
(Continued)

(52) U.S. Cl.
CPC ........ *G02B 6/02395* (2013.01); *C03C 25/105* (2013.01); *C03C 25/1065* (2013.01);
(Continued)

(58) Field of Classification Search
CPC .............. G02B 6/02395; C03C 25/105; C03C 25/1065; C03C 25/325; C03C 25/40; C03C 25/42; C03C 25/48; C08F 283/008
See application file for complete search history.

(56) References Cited

U.S. PATENT DOCUMENTS

| | | | | |
|---|---|---|---|---|
| 6,057,034 | A * | 5/2000 | Yamazaki | ............ C08G 18/672 528/65 |
| 6,584,263 | B2 * | 6/2003 | Fewkes | ................. C03C 25/106 385/128 |

(Continued)

FOREIGN PATENT DOCUMENTS

| | | |
|---|---|---|
| CN | 102686528 A | 9/2012 |
| JP | 2006-251424 A | 9/2006 |

(Continued)

OTHER PUBLICATIONS

Miyajima, T., Nishiyama, K., Satake, M. et al. Synthesis and process development of polyether polyol with high primary hydroxyl content using a new propoxylation catalyst. Polym J 47, 771-778 (2015). https://doi.org/10.1038/pj.2015.64 (Year: 2015).*
(Continued)

*Primary Examiner* — Peter Radkowski
(74) *Attorney, Agent, or Firm* — Faegre Drinker Biddle & Reath LLP (57) ABSTRACT

The optical fiber comprises a glass fiber comprising a core and a cladding, a primary resin layer in contact with the glass fiber and covering the glass fiber, and a secondary resin layer covering the primary resin layer, wherein the primary resin layer contains a cured product of a resin composition containing a urethane (meth)acrylate oligomer, a monomer, a photopolymerization initiator and an aromatic acid compound, a content of the aromatic acid compound is 20 ppm or more and 12000 ppm or less based on a total amount of (Continued)

the resin composition, and Young's modulus of the primary resin layer is 0.6 MPa or less at 23° C.±2° C.

7 Claims, 3 Drawing Sheets

(51) Int. Cl.
| | | |
|---|---|---|
| C03C 25/1065 | (2018.01) | |
| C03C 25/326 | (2018.01) | |
| C03C 25/40 | (2006.01) | |
| C03C 25/42 | (2006.01) | |
| C03C 25/48 | (2006.01) | |
| C08F 283/00 | (2006.01) | |

(52) U.S. Cl.
CPC ............ *C03C 25/326* (2013.01); *C03C 25/40* (2013.01); *C03C 25/42* (2013.01); *C03C 25/48* (2013.01); *C08F 283/008* (2013.01)

(56) References Cited

U.S. PATENT DOCUMENTS

| | | | | |
|---|---|---|---|---|
| 8,724,956 | B2* | 5/2014 | Wu | C03C 25/12 |
| | | | | 427/508 |
| 8,731,366 | B2* | 5/2014 | Wu | C03C 25/1065 |
| | | | | 427/508 |
| 9,057,814 | B2* | 6/2015 | Bickham | G02B 6/0281 |
| 9,128,245 | B2* | 9/2015 | Fabian | C03C 25/1065 |
| 9,383,511 | B2* | 7/2016 | Bickham | C03C 25/1065 |
| 9,488,774 | B2* | 11/2016 | Bookbinder | C03C 25/285 |
| 9,618,692 | B2* | 4/2017 | Berkey | C03C 13/046 |
| 10,094,973 | B2* | 10/2018 | Bickham | G02B 6/02009 |
| 10,429,579 | B2* | 10/2019 | Berkey | G02B 6/03627 |
| 2006/0067638 | A1* | 3/2006 | Chang | C08F 290/061 |
| | | | | 385/145 |
| 2012/0321265 | A1 | 12/2012 | Terruzzi et al. | |
| 2014/0064692 | A1* | 3/2014 | Wu | C09D 175/16 |
| | | | | 385/141 |
| 2014/0079367 | A1* | 3/2014 | Wu | C08G 18/672 |
| | | | | 385/141 |
| 2014/0294355 | A1* | 10/2014 | Bickham | G02B 6/02019 |
| | | | | 385/128 |
| 2014/0328566 | A1* | 11/2014 | Bickham | C03C 25/326 |
| | | | | 385/128 |
| 2014/0341521 | A1* | 11/2014 | Fabian | C09D 4/06 |
| | | | | 522/120 |
| 2015/0277031 | A1* | 10/2015 | Bookbinder | C03C 25/326 |
| | | | | 385/115 |
| 2016/0011365 | A1* | 1/2016 | Berkey | G02B 6/02014 |
| | | | | 385/127 |
| 2016/0306107 | A1* | 10/2016 | Bickham | G02B 6/02395 |
| 2017/0168231 | A1* | 6/2017 | Berkey | C03B 37/0183 |
| 2018/0128970 | A1 | 5/2018 | Homma et al. | |

FOREIGN PATENT DOCUMENTS

| | | |
|---|---|---|
| JP | 2008007717 A * | 1/2008 |
| JP | 2012-111674 A | 6/2012 |
| WO | WO-2011/063838 A1 | 6/2011 |

OTHER PUBLICATIONS

Sumiyoshi et al., On the photolysis of acylphosphine oxides: 1.laser flash photolysis studies with 2,4,6-trimethylbenzoyldiphenylphosphine oxide, Polymer, 1985, V. 26, p. 141 (Year: 1985).*

* cited by examiner

OPTICAL FIBER

TECHNICAL FIELD

The present disclosure relates to an optical fiber.

The present application claims priority based on Japanese Patent Application No. 2018-094592 filed on May 16, 2018, the contents of which are hereby incorporated in their entirety.

BACKGROUND ART

Generally, an optical fiber comprises a coating resin layer for protecting a glass fiber which is an optical transmission medium. A coating resin layer is constituted of, for example, a primary resin layer and a secondary resin layer. In order to reduce an increase in transmission loss induced by slight bending caused when lateral pressure is applied to an optical fiber, improvement of the lateral pressure property is required for an optical fiber.

In Patent literature 1, achievement of both softness (low Young's modulus) and mechanical strength of a primary resin layer has been investigated using a resin composition containing a urethane oligomer obtained by reacting a reaction product of an aliphatic polyether diol and a diisocyanate with a monohydric alcohol and hydroxyl group-containing (meth)acrylate.

CITATION LIST

Patent Literature

Patent Literature 1: JP2012-111674 A

SUMMARY OF INVENTION

The optical fiber according to one aspect of the present disclosure comprises a glass fiber comprising a core and a cladding, a primary resin layer in contact with the glass fiber and covering the glass fiber, and a secondary resin layer covering the primary resin layer, wherein the primary resin layer comprises a cured product of a resin composition containing a urethane (meth)acrylate oligomer, a monomer, a photopolymerization initiator and an aromatic acid compound, a content of the aromatic acid compound is 20 ppm or more and 12000 ppm or less based on a total amount of the resin composition, and a Young's modulus of the primary resin layer is 0.6 MPa or less at 23° C.±2° C.

DESCRIPTION OF EMBODIMENTS

Problem to be Solved by the Present Disclosure

An optical fiber is required to have maintained properties such as strength even in the case of being immersed in water for a long term. However, an optical fiber comprising a primary resin layer having low Young's modulus tends to have lower retention of glass strength under water immersion. Therefore, the object of the present disclosure is to provide an optical fiber which enables suppression of reduction in glass strength even in the case of being immersed in water for a long term.

Effect of the Present Disclosure

According to the present disclosure, an optical fiber can be provided which enables suppression of reduction in glass strength even in the case of being immersed in water for a long term.

Description of Embodiments of the Present Disclosure

First, the contents of the embodiments of the present disclosure will be listed and described. The optical fiber according to one aspect of the present disclosure comprises a glass fiber comprising a core and a cladding, a primary resin layer in contact with the glass fiber and covering the glass fiber, and a secondary resin layer covering the primary resin layer, wherein the primary resin layer comprises a cured product of a resin composition containing a urethane (meth)acrylate oligomer, a monomer, a photopolymerization initiator and an aromatic acid compound, a content of the aromatic acid compound is 20 ppm or more and 12000 ppm or less based on a total amount of the resin composition, and a Young's modulus of the primary resin layer is 0.6 MPa or less at 23° C.±2° C.

By forming a primary resin layer having a low Young's modulus by use of a resin composition containing a specific acid compound, reduction in glass strength of an optical fiber can be suppressed even in the case that the optical fiber is immersed in water for a long term.

From the viewpoint of adjusting the acidity of the primary resin layer, the above resin composition may contain two or more aromatic acid compounds. From the viewpoint of improving compatibility with resin components such as an oligomer and a monomer to manufacture an optical fiber having higher glass strength, the aromatic acid compounds may include diphenyl phosphinic acid and trimethylbenzoic acid.

From the viewpoint of facilitating curing of the resin composition with ultraviolet to further enhance the glass strength of the optical fiber, the above resin composition may contain a polar monomer as a monomer and the content of the polar monomer may be 3 mass % or more and 15 mass % or less based on the total amount of the resin composition.

From the viewpoint of improving adhesion of the primary resin layer to a glass fiber to enhance the retention of the glass strength under high-temperature and high-humidity conditions, the resin composition may further contain two or more silane coupling agents.

Details of Embodiments of the Present Disclosure

Specific examples of the resin composition and the optical fiber according to the embodiments of the present disclosure will be described with reference to the drawings as needed. The present invention is not limited to these examples, but is defined by the scope of claims, and intended to encompass meanings equivalent to the scope of claims and all modifications within the scope of claims. In the descriptions below, the identical sign is applied to the identical element in the description of drawings to avoid repeated descriptions.

Figure 1:
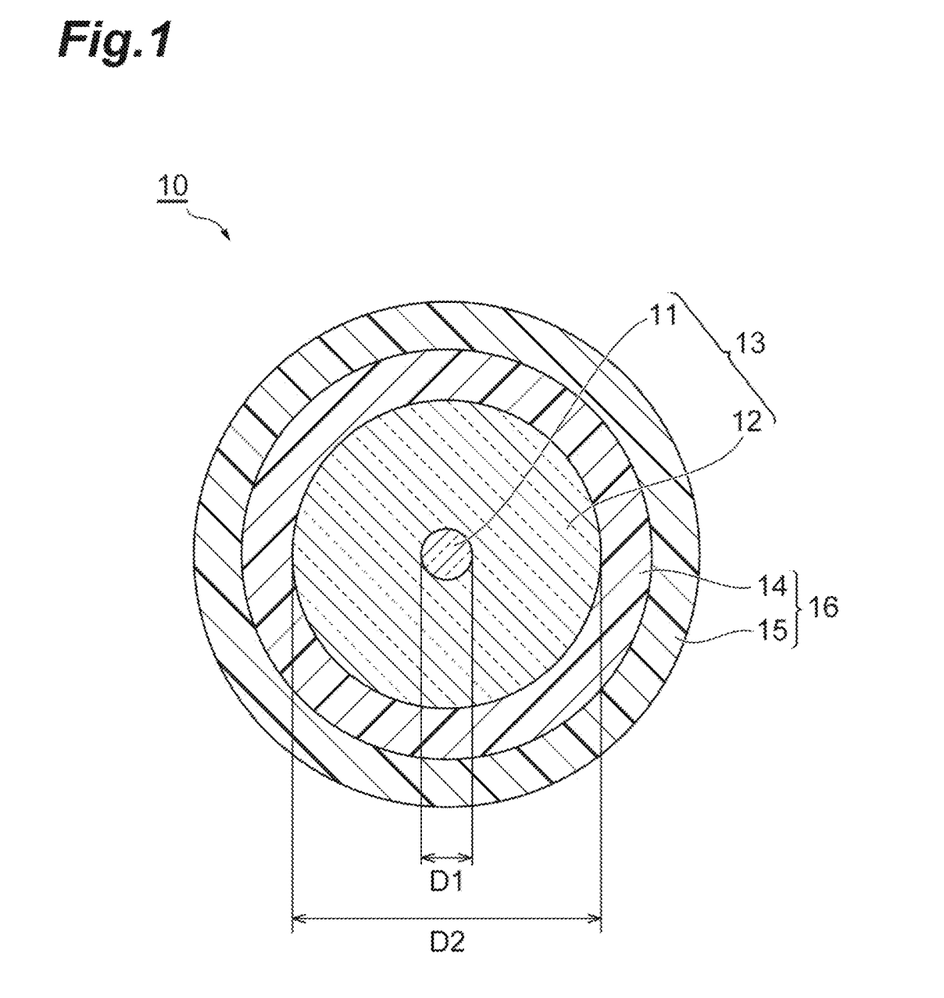
FIG. 1 is a schematic cross-sectional view showing an example of the optical fiber according to the present embodiment.

FIG. 1 is a schematic cross-sectional view showing one example of the optical fiber according to the present embodiment. An optical fiber 10 comprises a glass fiber 13 comprising a core 11 and a cladding 12, and a coating resin layer 16 comprising a primary resin layer 14 provided on the outer periphery of the glass fiber 13 and a secondary resin layer 15.

The cladding 12 surrounds the core 11. The core 11 and the cladding 12 primarily contain glass such as silica glass, and for example, germanium-added silica can be used for the core 11, and pure silica or fluorine-added silica can be used for the cladding 12.

In FIG. 1, for example, the outer diameter of the glass fiber 13 (D2) is about 125 μm, and the diameter of the core 11 (D1) constituting the glass fiber 13 is about 7 to 15 μm.

The thickness of the coating resin layer 16 is usually about 60 to 70 μm. The thickness of each of the primary resin layer 14 and the secondary resin layer 15 may be about 10 to 50 μm, for example, the thickness of the primary resin layer 14 may be 35 μm, and the thickness of the secondary resin layer 15 may be 25 μm. The outer diameter of the optical fiber 10 may be about 245 to 265 μm. The thickness of the coating resin layer 16 may be about 27 to 48 μm. In that case, the thickness of each of the primary resin layer 14 and the secondary resin layer 15 may be about 10 to 38 μm, for example, the thickness of the primary resin layer 14 may be 25 μm, and the thickness of the secondary resin layer 15 may be 10 μm. The outer diameter of the optical fiber 10 may be about 180 to 220 μm.

From the viewpoint of improving the glass strength of the optical fiber, the Young's modulus of the primary resin layer is 0.6 MPa or less at 23° C., preferably 0.5 MPa or less, more preferably 0.3 MPa or less. The lower limit of Young's modulus of the primary resin layer is not particularly limited, and is about 0.05 MPa. The Young's modulus of the primary resin layer can be measured by Pullout Modulus test at 23° C. The Young's modulus of the primary resin layer can be adjusted by the type of an oligomer, the molecular weight of an oligomer, the type of a monomer, the amount of a monomer to be added, etc.

The primary resin layer 14 can be formed by curing an UV-curable resin composition containing a urethane (meth)acrylate oligomer, a monomer, a photopolymerization initiator and an aromatic acid compound.

Herein, a (meth)acrylate means an acrylate or a methacrylate corresponding thereto. This is also applied to other similar expressions such as (meth)acrylic acid.

Examples of the urethane (meth)acrylate oligomer include oligomers obtained by reacting a polyol compound, a polyisocyanate compound and a hydroxyl group-containing (meth)acrylate compound.

Examples of the polyol compound include polytetramethylene glycol, polypropylene glycol and bisphenol A-ethylene oxide adduct diol. From the viewpoint of reducing the Young's modulus of the primary resin layer, the number average molecular weight of the polyol compound may be 1000 to 8000. Examples of the polyisocyanate compound include 2,4-tolylene diisocyanate, 2,6-tolylene diisocyanate, isophorone diisocyanate and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate and tripropylene glycol (meth)acrylate.

As a catalyst for synthesizing a urethane (meth)acrylate oligomer, an organic tin compound is generally used. Examples of the organic tin compound include dibutyltin dilaurate, dibutyltin diacetate, dibutyltin malate, dibutyltin bis(2-ethylhexyl mercaptoacetate), dibutyltin bis(isooctyl mercaptoacetate) and dibutyltin oxide. From the viewpoint of easy availability or catalytic performance, dibutyltin dilaurate or dibutyltin diacetate is preferably used as a catalyst.

From the viewpoint of reducing the Young's modulus of the primary resin layer, a lower alcohol having 5 or less carbon atoms may be used in synthesis of a urethane (meth)acrylate oligomer. Examples of the lower alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol and 2,2-dimethyl-1-propanol.

Hereinafter, preparation of a urethane (meth)acrylate oligomer will be described with reference to specific examples. For example, when polypropylene glycol as a polyol, isophorone diisocyanate as a polyisocyanate, 2-hydroxyethyl acrylate as a hydroxyl group-containing (meth)acrylate, and methanol as an alcohol are used, the urethane (meth)acrylate oligomers including 3 types of reaction products shown below can be obtained:

(1) H-I-(PPG-I)n-H
(2) H-I-(PPG-I)n-Me
(3) Me-I-(PPG-I)n-Me wherein H represents a residue of 2-hydroxyethyl acrylate, I represents a residue of isophorone diisocyanate, PPG represents a residue of polypropylene glycol, Me represents a residue of methanol and n represents an integer of 1 or more.

Since the reaction product (1) is a both-ends reactive oligomer, it enhances cross-link density of a cured product, on the other hand, since the reaction product (2) is a one-end reactive oligomer, it has an effect of reducing cross-link density of a cured product, and thus the Young's modulus can be reduced. Since the reaction product (3) is a both-ends non-reactive oligomer and does not undergo UV-curing, the reaction product is preferably prepared so that the reaction product (3) is formed as little as possible. Also in the case of using an alcohol other than methanol, a one-end non-reactive oligomer or a both-ends unreactive oligomer can be prepared.

In synthesis of a urethane (meth)acrylate oligomer, a silane coupling agent having a functional group reactive with an isocyanate group may be used. Examples of the silane coupling agent having a functional group reactive with an isocyanate group include, for example, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-mercaptopropylmethyldimethoxysilane and 3-mercaptopropyltrimethoxysilane. A polyol compound and an isocyanate compound are reacted to obtain a product in the state of having isocyanate groups at both ends, and a hydroxyl group-containing (meth)acrylate compound and a silane coupling agent are used in combination to react with the isocyanate groups, and thus an oligomer having a silane coupling agent added to one end can be synthesized in addition to a both-ends reactive oligomer. As a result, since the oligomer can react with glass, adhesion between the glass fiber 13 and the primary resin layer 14 can be improved.

As a monomer, a monofunctional monomer having one polymerizable group and a multifunctional monomer having two or more polymerizable groups can be used. Two or more monomers may be mixed before use.

Examples of the monofunctional monomer include, for example, (meth)acrylate monomers such as methyl (meth)acrylate, ethyl (meth)acrylate, propyl (meth)acrylate, n-butyl (meth)acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, noylphenol polyethylene glycol (meth)acrylate, nonylphenoxy polyethylene glycol (meth)acrylate and isobornyl (meth)acrylate; carboxyl group-containing monomers such as (meth)acrylic acid, (meth)acrylic acid dimer, carboxyethyl (meth)acrylate, carboxypentyl (meth)acrylate and co-carboxy-polycaprolactone (meth)acrylate; heterocycle-containing (meth)acrylates such as 3-(3-pyridyl)propyl (meth)acrylate, N-acryloylmorpholine, N-vinylpyrrolidone, N-vinylcaprolactam, N-acryloylpiperidine, N-methacryloylpiperidine and N-acryloylpyrrolidine; maleimide monomers such as maleimide, N-cyclohexylmaleimide and N-phenylmaleimide; N-substituted amide monomers such as (meth)acrylamide, N,N-dimethyl (meth)acrylamide, N,N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide and N-methylolpropane (meth)acrylamide; aminoalkyl (meth)acrylate monomers such as aminoethyl (meth)acrylate, aminopropyl (meth)acrylate, N,N-dimethylaminoethyl (meth)acrylate and t-butylaminoethyl (meth)acrylate; succinimide monomers such as N-(meth)acryloyloxymethylene succinimide, N-(meth)acryloyl-6-oxyhexamethylene succinimide and N-(meth)acryloyl-8-oxyoctamethylene succinimide.

A polar monomer may be used as a monofunctional monomer since it facilitates curing of the resin composition with ultraviolet light and decreases the remaining uncured components in the primary resin layer. Examples of the polar monomer include the above-mentioned heterocycle-containing (meth)acrylates, N-substituted amide monomers, aminoalkyl (meth)acrylate monomers and succinimide monomers. Among these, a heterocycle-containing (meth)acrylate is preferable as the polar monomer, and N-vinylcaprolatam is more preferable, since they hardly suffer from curing inhibition by oxygen.

From the viewpoint of further enhancing glass strength of the optical fiber, the content of a polar monomer is preferably 3 mass % or more and 15 mass % or less, more preferably 7 mass % or more and 15 mass % or less based on the total amount of the resin composition.

Examples of the multifunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of bisphenol A-alkylene oxide adduct, tetraethylene glycol di(meth)acrylate, neopentylglycol hydroxypivalate di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, di(meth)acrylate of bisphenol A-EO adduct, trimethylolpropane tri(meth)acrylate, trimethyloloctane tri(meth)acrylate, trimethylolpropanepolyethoxy tri(meth)acrylate, trimethylolpropanepolypropoxy tri(meth)acrylate, trimethylolpropanepolyethoxypolypropoxy tri(meth)acrylate, tris[(meth)acryloyloxyethyl] isocyanurate, pentaerythritol tri(meth)acrylate, pentaerythritolpolyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate and caprolactone-modified tris[(meth)acryloyloxyethyl] isocyanurate.

A photopolymerization initiator can be appropriately selected from known radical photopolymerization initiators and used. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropane-1-one, bis(2,6-dimethoxybenzoyl)-2,4,4-trimethylpentyl phosphine oxide, 2-methyl-1-[4-(methylthio)phenyl]-2-morpholino-propane-1-one (Omnirad 907, manufactured by IGM Resins, B.V.), 2,4,6-trimethylbenzoyl diphenylphosphineoxide (Omnirad TPO, manufactured by IGM Resins, B.V.) and bis(2,4,6-trimethylbenzoyl)phenylphosphineoxide (Omnirad 819, manufactured by IGM Resins, B.V.). Two or more photopolymerization initiators may be mixed before use, but at least 2,4,6-trimethylbenzoyl diphenylphosphineoxide is preferably contained.

An aromatic acid compound is not particularly limited as long as it is a compound having an aromatic ring and an acid group. Examples of the aromatic acid compound include an aromatic carboxylic acid, an aromatic phosphinic acid and an aromatic phosphonic acid. From the viewpoint of adjusting the acidity of the primary resin layer, two or more compounds each having a distinct acidity may be mixed before use as aromatic acid compounds.

Examples of the aromatic carboxylic acid include benzoic acid, phthalic acid, methylbenzoic acid, dimethylbenzoic acid, trimethylbenzoic acid, hydroxymethylbenzoic acid, propylbenzoic acid, butylbenzoic acid, hexylbenzoic acid, naphthalenecarboxylic acid and anthracarboxylic acid.

Examples of the aromatic phosphinic acid include diphenylphosphinic acid and phenylphosphinic acid. Examples of the aromatic phosphonic acid include phenylphosphonic acid and 4-methoxyphenylphosphonic acid.

From the viewpoint of improving compatibility with resin components such as an oligomer and a monomer to manufacture an optical fiber having higher glass strength, preferably an aromatic carboxylic acid and an aromatic phosphinic acid are used in combination as aromatic acid compounds, more preferably diphenyl phosphinic acid and trimethylbenzoic acid are used in combination.

The content of the aromatic acid compound is 20 ppm or more and 12000 ppm or less, preferably 25 ppm or more and 11000 ppm or less, and more preferably 30 ppm or more and 10000 ppm or less based on the total amount of the resin composition, since reduction in glass strength of the optical fiber is suppressed by the above content when the optical fiber is immersed in water for a long term.

The above resin composition may further contain a silane coupling agent, a photoacid generator, a levelling agent, an anti-foaming agent, an antioxidant, etc.

By using a silane coupling agent, adhesion between the glass fiber 13 and the primary resin layer 14 can be adjusted, and dynamic fatigue property can be improved. A silane coupling agents is not particularly limited as long as it does not inhibit curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, 3-glycidoxypropyl trimethoxysilane, 3-glycidoxypropylmethyldiethoxysilane, 3-methacryloxypropyl trimethoxysilane, N-(β-aminoethyl)-γ-aminopropyl trimethoxysilane, N-(β-aminoethyl)-γ-aminopropyltrimethyl dimethoxysilane, N-phenyl-3-aminopropyl trimethoxysilane, 3-chloropropyltrimethoxysilane, 3-mercaptopropyltrimethoxysilane, 3-aminopropyltrimethoxysilane, bis-[3-(triethoxysilyl)propyl] tetrasulfide, bis-[3-(triethoxysilyl)propyl] disulfide, γ-trimethoxysilylpropyl dimethylthiocarbamyl tetrasulfide and γ-trimethoxysilylpropyl benzothiazyl tetrasulfide.

From the viewpoint of improving adhesion of the primary resin layer to a glass fiber to enhance the retention of the glass strength under high-temperature and high-humidity conditions, the resin composition for forming the primary resin layer preferably contains two or more silane coupling agents having different reactivities.

An onium salt having a structure of $A^+B^-$ may be used as a photoacid generator. Examples of the photoacid generator include a sulfonium salt such as UVACURE1590 (manufacture by DAICEL-CYTEC Co., Ltd.) and CPI-100P, 110P, 210S (manufactured by San-Apro Ltd.), an iodonium salt such as Omnicat 250 (manufactured by IGM Resins, B.V.), WPI-113 (manufactured by FUJIFILM Wako Pure Chemical Corporation) and Rp-2074 (manufactured by Rhodia Japan, Ltd.).

The secondary resin layer 15 can be formed by, for example, curing a UV-curable resin composition containing a urethane (meth)acrylate oligomer, a monomer and a photopolymerization initiator. A urethane (meth)acrylate oligomer, a monomer and a photopolymerization initiator are appropriately selected from those exemplified for the resin composition for forming the primary resin layer. The secondary resin layer 15 may contain inorganic oxide particles such as silica and alumina. However, the resin composition for forming the secondary resin layer has different composition from that of the resin composition for forming the primary resin layer.

The Young's modulus of the secondary resin layer is preferably 500 MPa or more, more preferably 800 MPa or more at 23° C. The Young's modulus of the secondary resin layer may be 3000 MPa or less, 2500 MPa or less, 1400 MPa or less or 1200 MPa or less at 23° C. When the Young's modulus of the secondary resin layer is 500 MPa or more, the lateral pressure resistance property tends to be improved, and when it is 3000 MPa or less, the secondary resin layer has adequate elongation at break, and thus it is hardly damaged during coating removal and has excellent coating removability. When the secondary resin layer is thin, glass strength tends to be reduced under water immersion. As the Young's modulus of the secondary resin layer is higher, the cross-link density of the secondary resin layer increases and the barrier property is enhanced, therefore the Young's modulus of the secondary resin layer may be 1500 MPa or more.

As for the properties of the optical fiber applied to the present disclosure, for example, the mode field diameter at a wavelength of 1310 nm may be 8.2 μm or more and 9.6 μm or less, the cable cutoff wavelength may be 1260 nm or less, an increase in loss at a wavelength of 1625 nm when the optical fiber is wound 100 times around a mandrel having a radius of 30 mm (per 100 of winding number) may be 0.1 dB or less, and an increase in loss at the wavelength of 1625 nm when the optical fiber is wound 10 times around a mandrel having a radius of 15 mm (per 10 of winding number) may be 1.0 dB or less. As for the property of the optical fiber, a difference between a transmission loss at a wavelength of 1550 nm when the optical fiber is wound at tensile strength of 80 g around a bobbin on which a metallic mesh material having a diameter of a longitudinal wire of 50 μm, a diameter of a lateral wire of 50 μm and a pitch of 150 μm is wound and a transmission loss at the wavelength of 1550 nm when the optical fibers are in the state of a bundle may be 1.0 dB/km or less. The properties of the optical fiber of the present disclosure are not limited to the above examples.

EXAMPLES

Hereinafter, the results of evaluation tests using Examples and Comparative Examples according to the present disclosure are shown to describe the present disclosure in more detail. The present invention is not limited to these Examples.

[Resin Composition for Primary Resin Layer]
(Oligomer)

Urethane acrylate oligomers a1, a2, a3 and a4 obtained by reacting polypropylene glycol having a molecular weight of 4000, isophorone diisocyanate, hydroxyethyl acrylate and methanol were prepared. In the urethane acrylate oligomers a1, a2, a3 and a4, the ratio of an oligomer having acryloyl groups at both ends (both-ends reactive oligomer) to an oligomer having an acryloyl group at one end (one-end reactive oligomer) is adjusted by varying the formulation ratio of hydroxyethyl acrylate and methanol.

(Monomer)

As monomers, ethylene oxide-modified nonylphenyl acrylate, N-vinylcaprolactam and 1,6-hexanediol diacrylate were prepared.

(Photopolymerization Initiator)

As a photopolymerization initiator, 2,4,6-trimethylbenzoyl diphenylphophine oxide was prepared.

(Acid Compound)

As aromatic acid compounds, diphenyl phosphinic acid and trimethylbenzoic acid were prepared. As an aliphatic acid compound, lactic acid was prepared.

(Silane Coupling Agent)

As a silane coupling agent, 3-mercaptopropyltrimethoxysilane (MPTS) and tetraethyl silicate (TEOS) were prepared.

(Resin Composition)

The above oligomer, monomer, photopolymerization initiator, acid compound and silane coupling agent were mixed to produce the resin composition for the primary resin layer shown in Tables 1 to 4, respectively. In Comparative Example 3, lactic acid is contained as an aliphatic acid compound. The values for N-vinylcaprolactam, MPTS, TEOS, diphenyl phosphinic acid, trimethylbenzoic acid and lactic acid shown in the tables are the content based on the total amount of the resin composition. The total amount of the resin composition may be considered as same as the total amount of the cured product of the resin composition.

[Resin Composition for Secondary Resin Layer]

A urethane acrylate oligomer was prepared which was a reaction product of a polypropylene glycol having a molecular weight of 1000, isophorone diisocyanate and 2-hydroxyethyl acrylate. 60 parts by mass of urethane acrylate oligomer, 19 parts by mass of isobornyl acrylate, 20 parts by mass of trimethylolpropane triacrylate and 1 part by mass of 2,4,6-trimethylbenzoyl diphenylphosphineoxide were mixed to produce the resin composition b1 for the secondary resin layer. Silica particles were added to the resin composition b1 to prepare the resin composition b3 for the secondary resin layer.

By varying the mixing ratio of the above urethane acrylate oligomer, isobornyl acrylate, trimethylolpropane triacrylate, epoxy acrylate having bisphenol A backbone and 2,4,6-trimethylbenzoyl diphenylphosphineoxide, the resin compositions b2, b4 and b5 for the secondary resin layer were prepared.

[Production of Optical Fiber]

By using the resin composition for the primary resin layer, the primary resin layer having a thickness of 15 to 35 μm was formed on the outer periphery of a glass fiber having a diameter of 125 μm and constituted of a core and a cladding, and the secondary resin layer was further formed on the outer periphery of the primary resin layer using the resin composition for the secondary resin layer to produce the optical fiber for Example and Comparative Example. The linear velocity was 1500 m/min.

(Young's Modulus of Primary Resin Layer)

The Young's modulus of the primary resin layer was measured by Pullout Modulus test at 23° C. Specifically, a cut was made in the coating resin layer of the optical fiber with a razor, etc. to cut the coating resin layer, then the coating resin layer (the primary resin layer and the secondary resin layer) was fixed and the glass fiber was pulled out. The stress of the primary resin layer was obtained from the amount of elastic deformation of the primary resin layer before pulling out of the glass fiber and the force of pulling the glass fiber.

(Young's Modulus of the Secondary Resin Layer)

The optical fiber was immersed in a solvent (ethanol:acetone=3:7), the coating resin layer in the form of a pipe was pulled out from the glass fiber, and the obtained sample (50 mm or more) was used to measure the Young's modulus of the secondary resin layer. The sample obtained by pulling out the coating resin layer in the form of a pipe was left still for 1 day or more under the conditions of 23±2° C. and 50±10% RH, then pulled using a tensile testing machine under the conditions of a tensile speed of 1 mm/min and a gauge length of 25 mm to obtain the stress-strain curve. The Young's modulus was obtained from 2.5% secant of the obtained curve.

(Glass Strength of Optical Fiber)

The bundle of the optical fiber was immersed in hot water at 85° C. for 60 days, and the glass strengths before and after immersion were evaluated. The quality of the glass strength was determined by measurement of 50% strength. 50% strength is a strength at which half the number of the optical fibers subjected to the test are fractured in the tensile test of optical fibers. In the present example, the tensile test was conducted at a tensile speed of 25 mm/min for each optical fiber subjected to the test. When 50% strength value of the glass strength after immersion is less than 80% relative to 50% strength value of the glass strength before immersion, the glass strength was determined as "poor (C)", in the case of 80 to 90%, it was determined as "good (B)" and in the case of more than 90%, it was determined as "excellent (A)".

(Measurement of Bending Loss)

The change of transmission loss (increase in loss) when the optical fiber was wound by 10 turns around a mandrel having a radius of 15 mm was obtained (R 15 mm×10 turns). When the increase in transmission loss at wavelength of 1625 nm was 1.0 dB or less, it was determined as an acceptable value.

(Lateral Pressure Resistance Property)

Figure 2A:
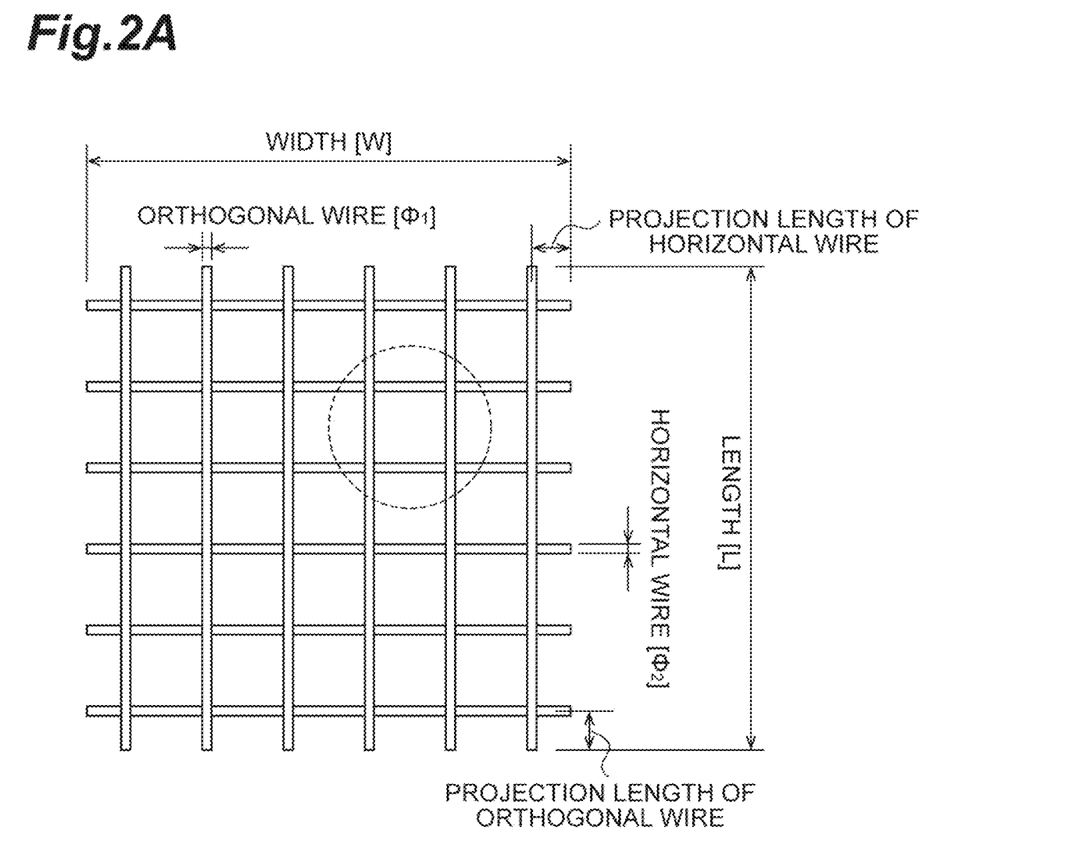
FIG. 2A is a drawing showing a configuration of the metallic mesh material used for a mesh lateral pressure test.
Figure 2B:
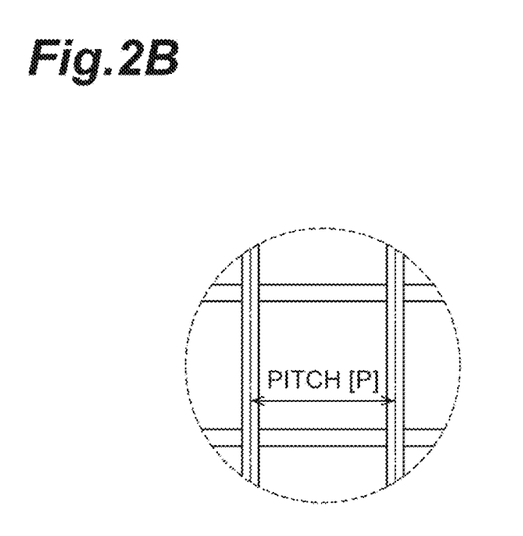
FIG. 2B is a partial enlarged view of FIG. 2A.

The lateral pressure resistance property of the optical fiber was evaluated by a mesh lateral pressure test. FIG. 2A is a drawing showing a configuration of the metallic mesh material 30 used for a mesh lateral pressure test, and FIG. 2B is a partial enlarged view of B in FIG. 2A. As shown in FIG. 2A and FIG. 2B, the metallic mesh material 30 has the form of a mesh over which a plurality of metallic wires are spread in a longitudinal direction and a lateral direction, respectively. Both the diameter of a longitudinal wire $\phi 1$ and the diameter of a lateral wire $\phi 2$ are 50 μm. Both pitches P between the centerlines of longitudinal wires and between the centerlines of lateral wires are 150 μm. The length of projecting part L1 of a longitudinal wire is 100 μm, and the length of projecting part L2 of a lateral wire is 100 μm.

The mesh lateral pressure test was conducted by winding the optical fiber 10 at a tensile strength of, for example, 80 g around a bobbin on which the metallic mesh material 30 shown in FIG. 2A and FIG. 2B was wound on a cylindrical part without any space, then obtaining the difference between the transmission loss value at wavelength of 1550 nm when the optical fiber was wound around a bobbin and the transmission loss value at wavelength of 1550 nm when the optical fibers are in the state being reeled off (the optical fiber 10 is in the state of being removed from the bobbin). The results are shown in Table 4.

TABLE 1

| | | Example | | | | | | | |
|---|---|---|---|---|---|---|---|---|---|
| | | 1 | 2 | 3 | 4 | 5 | 6 | 7 | 8 |
| Primary resin layer | Oligomer | a1 | a1 | a2 | a3 | a3 | a3 | a3 | a3 |
| | N-vinylcaprolactam (mass %) | 7 | 7 | 7 | 7 | 7 | 7 | 7 | 10 |
| | MPTS (mass %) | 0.5 | 0.5 | 0.5 | 0.5 | 0.5 | 0.5 | 0.5 | 0.5 |
| | TEOS (mass %) | — | — | — | — | — | — | — | — |
| | Diphenyl phosphinic acid (ppm) | 15 | 1200 | 1200 | 1200 | 5000 | 0 | 10000 | 1200 |
| | Trimethylbenzoic acid (ppm) | 15 | 1200 | 1200 | 1200 | 5000 | 10000 | 0 | 1200 |
| | Resin composition for secondary resin layer | b1 | b1 | b1 | b1 | b1 | b1 | b1 | b1 |
| Youngs modulus (MPa) | Primary resin layer | 0.5 | 0.5 | 0.3 | 0.1 | 0.1 | 0.1 | 0.1 | 0.1 |
| | Secondary resin layer | 1000 | 1000 | 1000 | 1000 | 1000 | 1000 | 1000 | 1000 |
| | Glass strength | B | B | B | B | A | A | A | A |

TABLE 2

| | | Example | | | | |
|---|---|---|---|---|---|---|
| | | 9 | 10 | 11 | 12 | 13 |
| Primary resin layer | Oligomer | a4 | a4 | a4 | a1 | a1 |
| | N-vinylcaprolactam (mass %) | 7 | 7 | 7 | 7 | 7 |
| | MPTS (mass %) | 0.5 | 1 | 0.5 | 0.5 | 0.5 |
| | TEOS (mass %) | — | — | 0.5 | — | — |
| | Diphenyl phosphinic acid (ppm) | 5000 | 5000 | 5000 | 15 | 15 |
| | Trimethylbenzoic acid (ppm) | 5000 | 5000 | 5000 | 15 | 15 |
| Resin composition for secondary resin layer | | b1 | b1 | b1 | b2 | b3 |
| Youngs modulus (MPa) | Primary resin layer | 0.05 | 0.05 | 0.05 | 0.5 | 0.5 |
| | Secondary resin layer | 1000 | 1000 | 1000 | 1500 | 1500 |
| | Glass strength | B | B | A | A | A |

TABLE 3

| | Comparative Example | 1 | 2 | 3 |
|---|---|---|---|---|
| Primary resin layer | Oligomer | a1 | a3 | a1 |
| | N-vinylcaprolactam (mass %) | 7 | 7 | 7 |
| | MPTS (mass %) | 0.5 | 0.5 | 0.5 |
| | TEOS (mass %) | — | — | — |
| | Diphenyl phosphinic acid (ppm) | 5 | 5 | — |
| | Trimethylbenzoic acid (ppm) | 5 | 5 | — |
| | Lactic acid (ppm) | — | — | 30 |
| Resin composition for secondary resin layer | | b1 | b1 | b1 |
| Youngs modulus (MPa) | Primary resin layer | 0.5 | 0.1 | 0.5 |
| | Secondary resin layer | 1000 | 1000 | 1000 |
| | Glass strength | C | C | C |

TABLE 4

| | | Example | | | | |
|---|---|---|---|---|---|---|
| | | 12 | 14 | 15 | 16 | 17 |
| | Outer diameter of fiber (μm) | 245 | 200 | 200 | 200 | 180 |
| Primary resin layer | Oligomer | a1 | a1 | a1 | a1 | a1 |
| | N-vinylcaprolactam (mass %) | 7 | 7 | 7 | 7 | 7 |
| | MPTS (mass %) | 0.5 | 0.5 | 0.5 | 0.5 | 0.5 |
| | TEOS (mass %) | — | — | — | — | — |
| | Diphenyl phosphinic acid (ppm) | 15 | 15 | 15 | 15 | 15 |
| | Trimethylbenzoic acid (ppm) | 15 | 15 | 15 | 15 | 15 |
| Resin composition for secondary resin layer | | b2 | b2 | b4 | b5 | b5 |
| Youngs modulus (MPa) | Primary resin layer | 0.5 | 0.5 | 0.5 | 0.5 | 0.5 |
| | Secondary resin layer | 1500 | 1500 | 1700 | 2000 | 2000 |
| | Mode field diameter (μm) (1310 nm) | 8.7 | 8.72 | 8.47 | 8.7 | 8.72 |
| | Cable cutoff wavelength (nm) | 1218 | 1236 | 1169 | 1218 | 1236 |
| | Bending loss (dB/10 turns) | 0.003 | 0.002 | 0.007 | 0.003 | 0.002 |
| | Lateral pressure resistance property (dB/km) | 0.01 | 0.3 | 0.2 | 0.08 | 0.5 |

REFERENCE SIGNS LIST

10: Optical fiber, 11: Core, 12: Cladding, 13: Glass fiber, 14: Primary resin layer, 15: Secondary resin layer, 16: Coating resin layer, 30: Metallic mesh material.

The invention claimed is:

1. An optical fiber comprising a glass fiber comprising a core and a cladding, a primary resin layer in contact with the glass fiber and covering the glass fiber, and a secondary resin layer covering the primary resin layer,
    wherein the primary resin layer comprises a cured product of a resin composition containing a urethane (meth) acrylate oligomer, a monomer, a photopolymerization initiator and an aromatic acid compound,
    a content of the aromatic acid compound is 20 ppm or more and 12000 ppm or less based on a total amount of the resin composition,
    a Young's modulus of the primary resin layer is 0.6 MPa or less at 23° C.±2° C.,
    the resin composition contains the aromatic acid compound comprising two or more aromatic acid compounds, and
    the aromatic acid compound comprises diphenyl phosphinic acid and trimethylbenzoic acid.

2. The optical fiber according to claim 1, wherein the resin composition contains a polar monomer as the monomer and a content of the polar monomer is 3 mass % or more and 15 mass % or less based on the total amount of the resin composition.

3. The optical fiber according to claim 1, wherein the resin composition further contains two or more silane coupling agents.

4. The optical fiber according to claim 1, wherein a Young's modulus of the secondary resin layer is 1500 MPa or more at 23° C.

5. The optical fiber according to claim 1, wherein the secondary resin layer contains an inorganic oxide.

6. The optical fiber according to claim 1,
wherein a mode field diameter of the optical fiber at a wavelength of 1310 nm is 8.2 μm or more and 9.6 μm or less, and a cable cutoff wavelength is 1260 nm or less,
wherein an increase in loss at a wavelength of 1625 nm when the optical fiber is wound around a mandrel having a radius of 15 mm is 1.0 dB or less per 10 of winding number, and
wherein a difference between a transmission loss at a wavelength of 1550 nm when the optical fiber is wound at tensile strength of 80 g around a bobbin on which a metallic mesh material having a diameter of a longitudinal wire of 50 μm, a diameter of a lateral wire of 50 μm and a pitch of 150 μm is wound and a transmission loss at the wavelength of 1550 nm when the optical fiber is in the state of a bundle is 1.0 dB/km or less.

7. The optical fiber according to claim 4,
wherein a mode field diameter of the optical fiber at a wavelength of 1310 nm is 8.2 μm or more and 9.6 μm or less, and a cable cutoff wavelength is 1260 nm or less,
wherein an increase in loss at a wavelength of 1625 nm when the optical fiber is wound around a mandrel having a radius of 15 mm is 1.0 dB or less per 10 of winding number, and
wherein a difference between a transmission loss at a wavelength of 1550 nm when the optical fiber is wound at tensile strength of 80 g around a bobbin on which a metallic mesh material having a diameter of a longitudinal wire of 50 μm, a diameter of a lateral wire of 50 μm and a pitch of 150 μm is wound and a transmission loss at the wavelength of 1550 nm when the optical fiber is in the state of a bundle is 1.0 dB/km or less.

* * * * *